United States Patent
Oetlinger

(10) Patent No.: US 11,022,160 B2
(45) Date of Patent: *Jun. 1, 2021

(54) PLATE MOUNT

(71) Applicant: Blanking Systems, Inc., Grafton, WI (US)

(72) Inventor: Frank E. Oetlinger, Grafton, WI (US)

(73) Assignee: Blanking Systems, Inc., Grafton, WI (US)

( * ) Notice: Subject to any disclaimer, the term of this patent is extended or adjusted under 35 U.S.C. 154(b) by 570 days.

This patent is subject to a terminal disclaimer.

(21) Appl. No.: 15/764,139

(22) PCT Filed: Oct. 7, 2016

(86) PCT No.: PCT/US2016/055950
§ 371 (c)(1),
(2) Date: Mar. 28, 2018

(87) PCT Pub. No.: WO2017/062744
PCT Pub. Date: Apr. 13, 2017

(65) Prior Publication Data
US 2018/0298931 A1    Oct. 18, 2018

Related U.S. Application Data

(60) Provisional application No. 62/238,446, filed on Oct. 7, 2015.

(51) Int. Cl.
*F16B 5/06* (2006.01)
*F16B 12/10* (2006.01)
(Continued)

(52) U.S. Cl.
CPC .......... *F16B 5/0642* (2013.01); *F16B 5/0241* (2013.01); *F16B 7/04* (2013.01);
(Continued)

(58) Field of Classification Search
CPC .................. F16B 7/187; F16B 2200/20; F16B 2200/205; F16B 2200/40; F16B 2200/403;
(Continued)

(56) References Cited

U.S. PATENT DOCUMENTS 5,683,198 A * 11/1997 Leutenegger ............. F16B 7/18
403/231
6,582,149 B1 * 6/2003 Holscher ................. E04B 2/766
403/255
(Continued)

FOREIGN PATENT DOCUMENTS

DE    2838163 A1    6/1979
EP    1497521 B1    5/2007
(Continued)

OTHER PUBLICATIONS

India Appln. No. 201817016948, Examination Report dated Jun. 19, 2020, 6 pages.
(Continued)

*Primary Examiner* — Jonathan P Masinick
(74) *Attorney, Agent, or Firm* — Boyle Fredrickson, S.C.

(57) ABSTRACT

A plate mount is provided for mounting a plate to a frame assembly. The plate mount includes a generally cylindrical head extendable through an aperture the plate and having an upper surface, a lower face, an outer peripheral surface, and an alignment structure receivable in a slot of the frame member. The cylindrical head including a bolt-receiving bore extending through the cylindrical head along a bore axes at an acute angle to the upper face. A flange extending radially extending from the outer peripheral surface of the cylindrical head. The flange has a diameter. At least one spacer is positionable about the outer peripheral surface of the cylindrical head at a location between the flange and the plate.

18 Claims, 3 Drawing Sheets

(51) Int. Cl.
*F16B 37/04* (2006.01)
*F16B 5/02* (2006.01)
*F16B 7/04* (2006.01)
*F16B 39/24* (2006.01)
*F16B 7/18* (2006.01)
*F16B 12/14* (2006.01)

(52) U.S. Cl.
CPC ............ *F16B 12/10* (2013.01); *F16B 37/047* (2013.01); *F16B 39/24* (2013.01); *F16B 5/0614* (2013.01); *F16B 7/187* (2013.01); *F16B 12/14* (2013.01)

(58) Field of Classification Search
CPC .... F16B 5/0642; F16B 5/0614; F16B 5/0628; F16B 12/10; F16B 12/14; F16B 37/045; F16B 37/047
See application file for complete search history.

(56) References Cited

U.S. PATENT DOCUMENTS

| | | | |
|---|---|---|---|
| 8,250,829 B2 * | 8/2012 | McPheeters | F16M 13/02 52/710 |
| 8,454,259 B2 * | 6/2013 | Oetlinger | E05D 5/0238 403/259 |
| 8,915,668 B2 | 12/2014 | Oetlinger | |
| 9,895,839 B2 * | 2/2018 | Ogawa | F16B 5/02 |
| 10,648,496 B2 * | 5/2020 | Oetlinger | F16B 5/02 |
| 2010/0284760 A1 * | 11/2010 | Rotolo | F16B 19/1081 411/44 |
| 2013/0106114 A1 * | 5/2013 | Wang | F16M 7/00 290/1 A |
| 2014/0072385 A1 | 3/2014 | Pham | |
| 2015/0023759 A1 | 1/2015 | Klopfenstein, II | |
| 2018/0283426 A1 * | 10/2018 | Oetlinger | F16B 12/50 |

FOREIGN PATENT DOCUMENTS

| | | | | |
|---|---|---|---|---|
| EP | 2664724 | A1 | 11/2013 | |
| EP | 2846054 | B1 * | 5/2017 | ............... F16B 21/09 |
| FR | 3049301 | A1 * | 9/2017 | ............... F16B 35/06 |
| GB | 2466347 | A | 6/2010 | |
| JP | 2008-008354 | | 1/2008 | |
| JP | 2011-017383 | | 1/2011 | |
| JP | 2014-532155 | | 12/2014 | |
| KR | 10-2011-0122261 | | 11/2011 | |
| WO | 2013055779 | A1 | 4/2013 | |

OTHER PUBLICATIONS

Japanese Appln. No. 2018-518513, Office Action dated Dec. 1, 2020, 6 pages and English Translation, 12 pages.

* cited by examiner

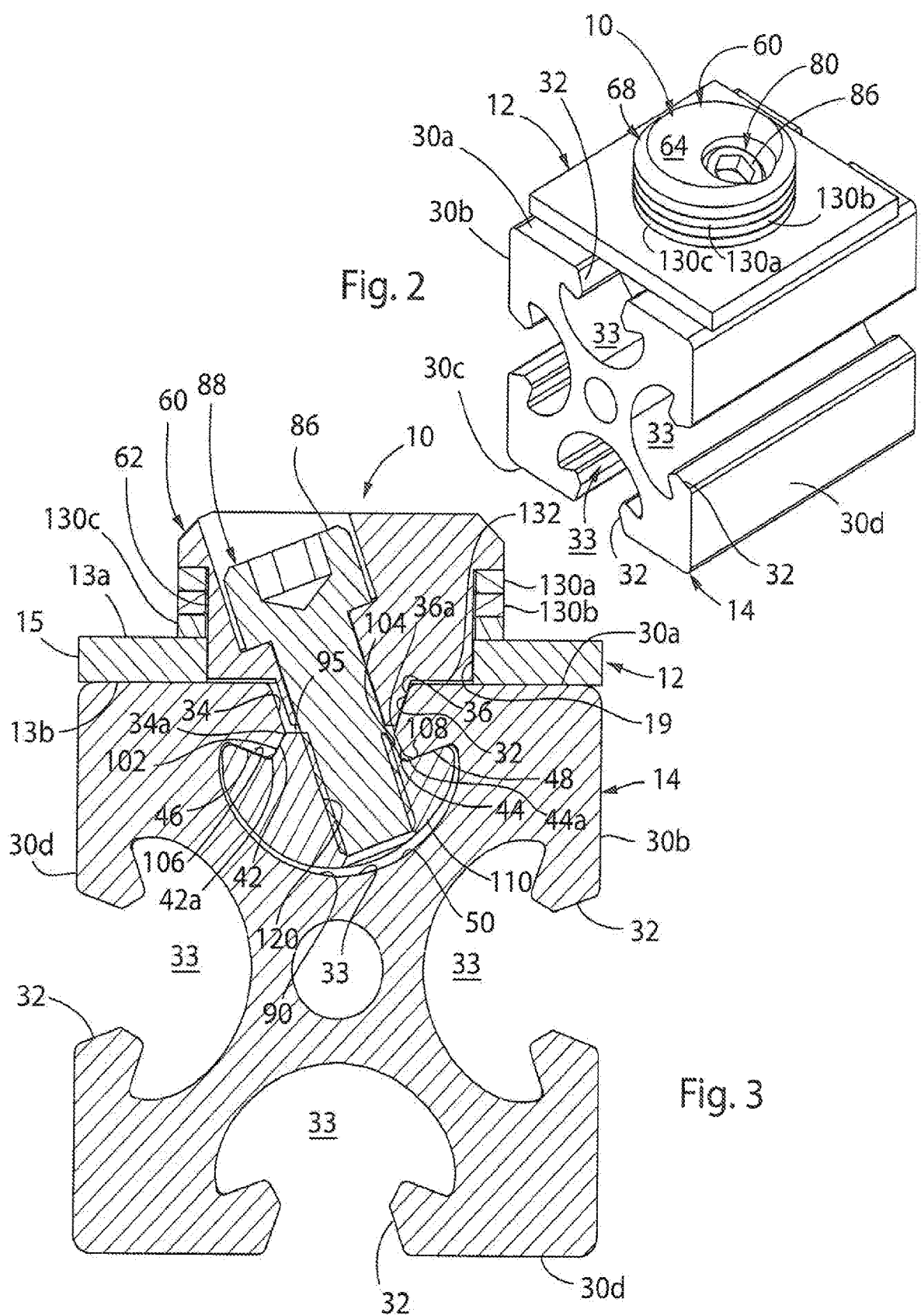

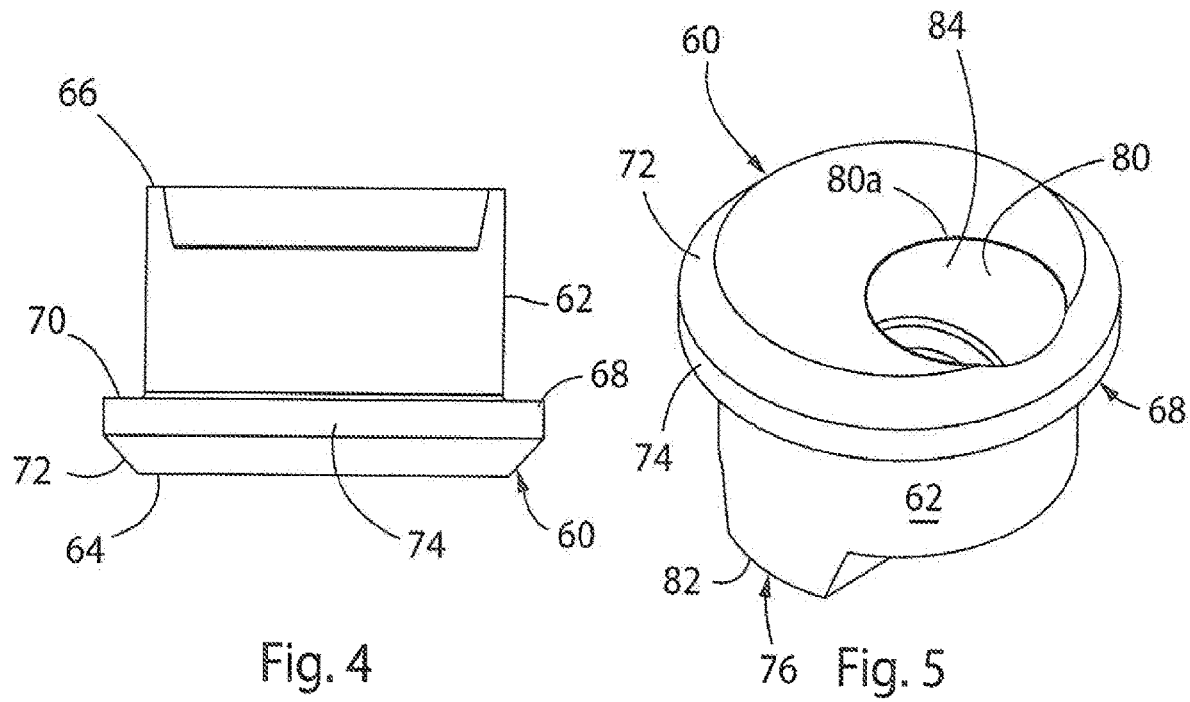
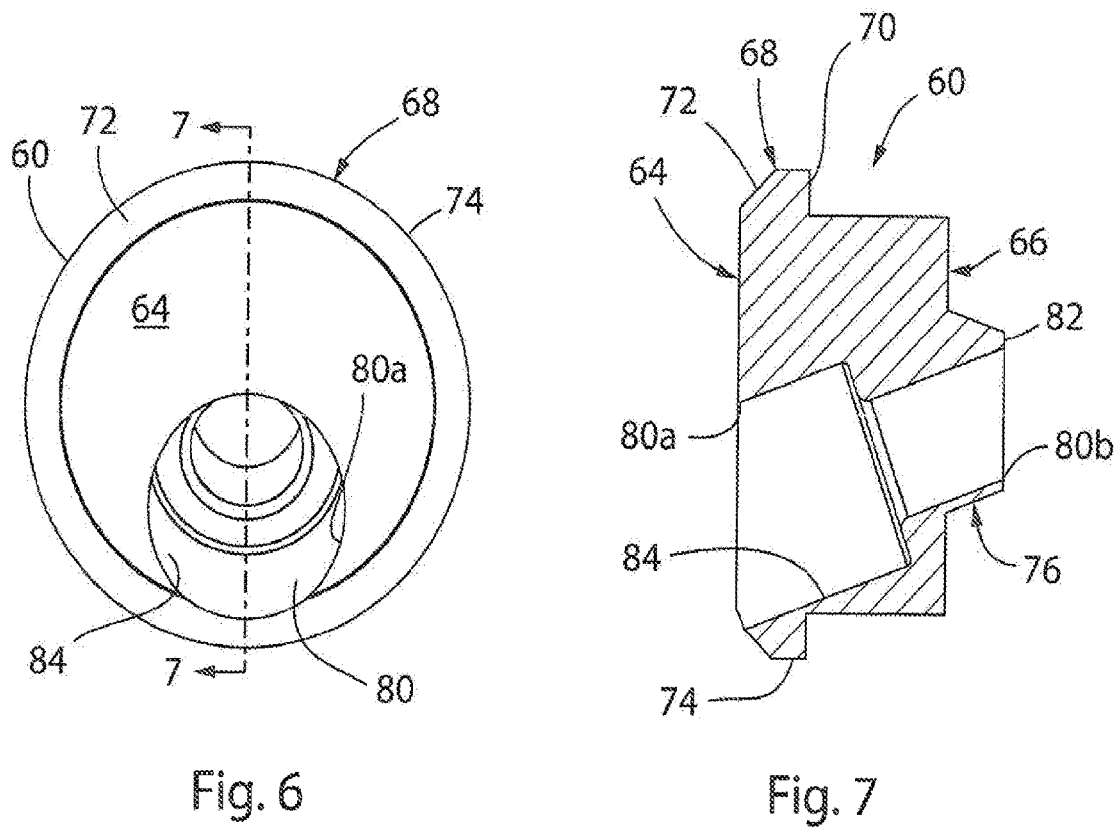

PLATE MOUNT

FIELD OF THE INVENTION

This invention relates generally to frame assemblies that are used in the manufacture of automation equipment, buildings, furniture, and/or other components, and in particular, to a plate mount for mechanically interlocking a plate to frame member of a frame assembly.

BACKGROUND AND SUMMARY OF THE INVENTION

As is known, structural frames are used in the construction of a wide variety of products, including everything from automation equipment and furniture to buildings and the like. Structural frames typically incorporate horizontal and vertical frame members tied together by corner pieces, joints or bonding. Coverings, such as panels, may be secured to the frame members to isolate the interior of the structural frames and/or to provide an aesthetically pleasing appearance. In addition, various components may be interconnected to the structural frame to allow the structural frame to be used for its intended purpose. By way of example, hinges may be interconnected to the structural frame to facilitate the mounting of a door thereto. Alternatively, sliders may be interconnected to the sides of a structural frame so as to allow the structural frame to function as a drawer. It can be appreciated that other types of components may be interconnected to the structural frame to facilitate the intended purpose thereof.

Typically, the components of a structural frame are held together by means of friction. For examples, nut and bolt combinations are often used to secure horizontal and vertical frame members together. However, the nut and bolt combinations holding the structural frames together often come loose over time when subjected to vibration and/or the environment. As the nut and bolt combinations loosen, the integrity of the structural frame may be compromised. Further, as the nut and bolt combinations loosen, the frame members and the components therefore rotate with respect to one another, thereby compromising the alignment of the structural frame.

Therefore, it is a primary object and feature of the present invention to provide a plate which mechanically interlocks a panel or plate to a frame in such a manner as to maintain connection to the frame during repeated use.

It is a further object and feature of the present invention to provide a plate mount which allows for a plate or panel to be simply and easily mechanically interlocked to a frame.

It is a still further object and feature of the present invention to provide a plate mount which allows for a plate or panel to be mechanically interlocked to a frame and which is adapted for a variety of uses.

In accordance with an aspect of the present invention, a plate mount is provided for mounting a plate having an inner face, an outer face and an aperture extending between the inner face and the outer face to a frame assembly. The frame assembly includes a frame member having an outer surface, defining a longitudinal axis, and having a slot that extends parallel to the longitudinal axis and a cavity that extends parallel to the longitudinal axis and connects to the slot. The plate mount includes a nut receivable in the cavity and a generally cylindrical head extendable through the aperture in the plate. The cylindrical head has an upper surface, a lower face, an outer peripheral surface, and an alignment structure receivable in the slot of the frame member. The cylindrical head includes a bolt-receiving bore extending through the cylindrical head along a bore axes at acute angles to the upper face. A flange extends radially from the outer peripheral surface of the cylindrical head. The flange has a diameter. At least one spacer is positionable about the outer peripheral surface of the cylindrical head at a location between the flange and the outer surface of the frame member. The at least one spacer has a diameter greater than a diameter of the aperture in the plate. A bolt extends angularly through the slot and engages the nut received in the cavity so to interconnect the cylindrical head to the frame member and exert a clamping force on the plate between the at least one spacer and the frame member.

The frame member includes an outer abutment wall that defines at least a portion of a periphery the slot, an inner abutment wall that is connected to the outer abutment wall and that defines at least a portion of a periphery of the cavity, and an edge defined at a location of connection between the outer and inner abutment walls. The edge defining a pivot point about which the nut can pivot when the nut engages the edge while moving angularly through the cavity. The nut further includes a top wall and a shoulder that extend in a transverse direction away from the top wall. The shoulder engages the inner abutment wall of the frame member. The nut further includes a sidewall that extends between the top wall and the shoulder.

The alignment structure includes first and second alignment walls intersecting the lower face of the cylindrical head. The first and second alignment walls diverge from each other as the first and second alignment walls extend away from the lower face of the cylindrical head. The bolt-receiving bore includes an enlarged portion communicating with the upper surface of the cylindrical head and which is adapted for receiving a head of the bolt therein. The bolt-receiving bore includes a reduced diameter portion having a first end communicating with the enlarged portion of the bolt-receiving bore and a second end communicating with lower face of the cylindrical head. The reduced diameter portion of the bolt-receiving bore is adapted for receiving a shaft of the bolt therethrough.

In accordance with a further aspect of the present invention, a plate mount is provided for mounting a plate to a frame assembly. The plate mount includes a generally cylindrical head extendable through an aperture the plate and having an upper surface, a lower face, an outer peripheral surface, and an alignment structure receivable in a slot of the frame member. The cylindrical head including a bolt-receiving bore extending through the cylindrical head along a bore axes at an acute angle to the upper face. A flange extending radially extending from the outer peripheral surface of the cylindrical head. The flange has a diameter. At least one spacer is positionable about the outer peripheral surface of the cylindrical head at a location between the flange and the plate.

The alignment structure includes first and second alignment walls intersecting the lower face of the cylindrical head. The first and second alignment walls diverge from each other as the first and second alignment walls extend away from the lower face of the cylindrical head. The bolt-receiving bore includes an enlarged portion communicating with the upper surface of the cylindrical head and being adapted for receiving a head of a bolt therein. The bolt-receiving bore also includes a reduced diameter portion having a first end communicating with the enlarged portion of the bolt-receiving bore and a second end communicating with lower face of the cylindrical head. The reduced diameter portion of the bolt-receiving bore is adapted for receiving a shaft of the bolt therethrough. A bolt and nut combination is provided for interconnecting the plate mount to the frame assembly. The bolt extendable through the bolt-receiving bore and the nut is receivable in a slot in the frame assembly.

In accordance with a still further aspect of the present invention, a frame assembly is provided. The frame assembly includes a frame member having an outer surface, defining a longitudinal axis, and having a slot that extends parallel to the longitudinal axis and a cavity that extends parallel to the longitudinal axis and connects to the slot. A plate has an inner face, an outer face and an aperture having a diameter and extending between the inner face and the outer face. A nut is receivable in the cavity. A plate mount has a generally cylindrical head extendable through the aperture in the plate. The cylindrical hand includes an upper surface, a lower face, an outer peripheral surface, an alignment structure receivable in the slot of the frame member, and a bolt-receiving bore extending between the upper surface and the lower face along a bore axes at acute angles to the upper face. A flange extends radially form the outer peripheral surface of the cylindrical head. The flange has a diameter greater than the diameter of the aperture. At least one spacer is positionable about the outer peripheral surface of the cylindrical head at a location between the flange and the outer surface of the frame member. The at least one spacer has a diameter greater than the diameter of the aperture in the plate. A bolt extends angularly through the bolt-receiving bore and engages the nut received in the cavity so to interconnect the cylindrical head to the frame member and capture the plate between the at least one spacer and the frame member.

The alignment structure includes first and second alignment walls intersecting the lower face of the cylindrical head. The first and second alignment walls diverge from each other as the first and second alignment walls extend away from the lower face of the cylindrical head. The bolt-receiving bore includes an enlarged portion communicating with the upper surface of the cylindrical head and is adapted for receiving a head of a bolt therein.

The bolt-receiving bore includes a reduced diameter portion having a first end communicating with the enlarged portion of the bolt-receiving bore and a second end communicating with lower face of the cylindrical head. The reduced diameter portion of the bolt-receiving bore is adapted for receiving a shaft of the bolt therethrough.

BRIEF DESCRIPTION OF THE DRAWINGS

The drawings furnished herewith illustrate a preferred construction of the present invention in which the above advantages and features are clearly disclosed, as well as others which will be readily understood from the following description of the illustrated embodiment.

In the drawings:

FIG. 2 is an isometric view of the plate mount of FIG. 1 mounting a plate to a frame member;

FIG. 3 is a cross-sectional view of the plate mount of FIG. 1;

FIG. 4 is a side elevational view of a cylindrical head of the plate mount of the present invention;

FIG. 5 is an isometric view of the cylindrical head of the plate mount of the present invention;

FIG. 6 is a top plan view of the cylindrical head of the plate mount of the present invention; and FIG. 7 is a cross-sectional view of the cylindrical head of the plate mount of the present invention taken along line 7-7 of FIG. 6.

DETAILED DESCRIPTION OF THE DRAWINGS

Figure 1:
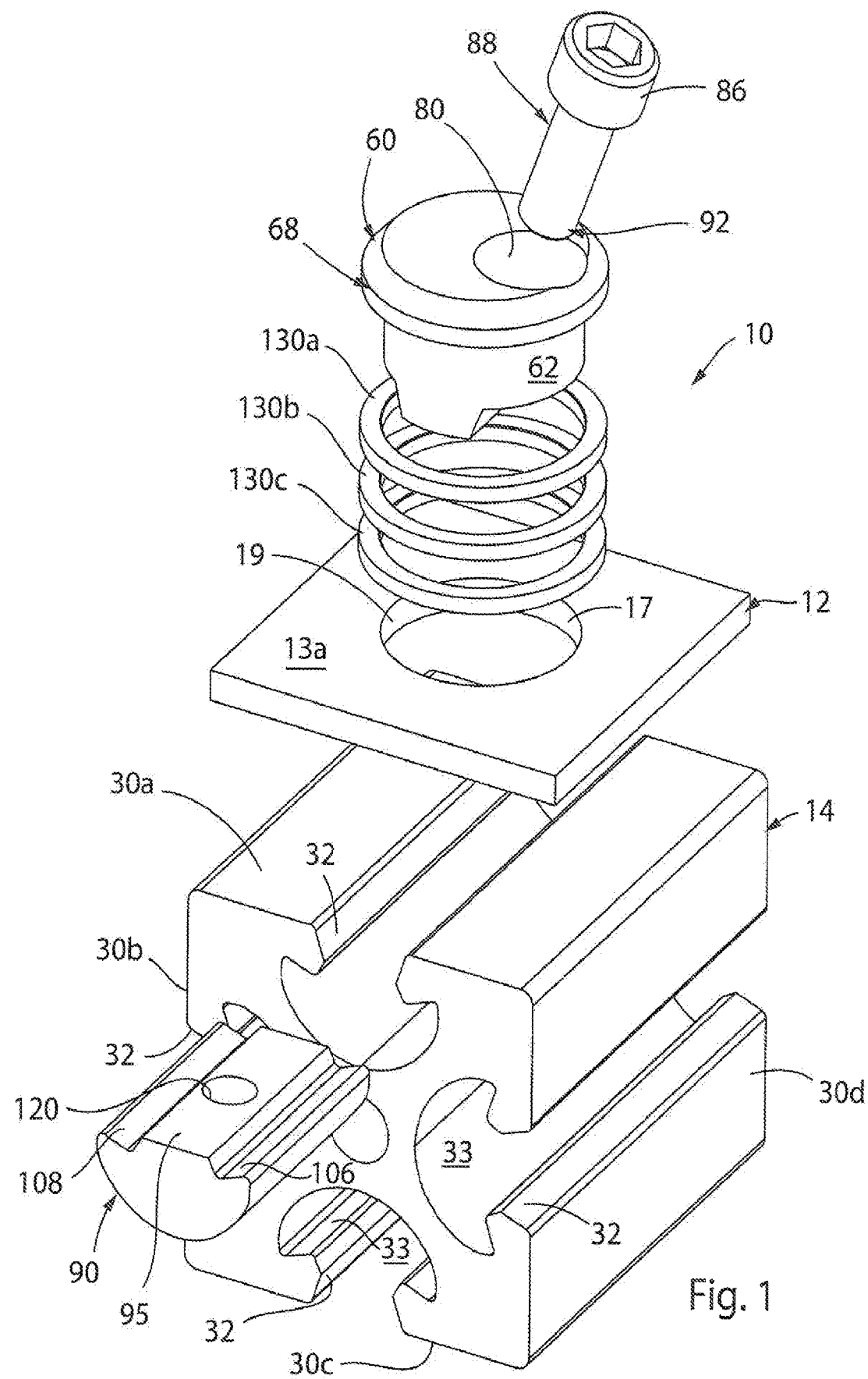
FIG. 1 is an exploded, isometric view of a plate mount in accordance with the present invention for mounting a plate to a frame member.

Referring to FIGS. 1-3, a plate mount in accordance with the present invention is generally designated by the numeral 10. As hereinafter described, it is intended to plate mount 10 to interconnect plate 12 to a rail or frame member 14 of a frame assembly constructed from various components. Plate 12 includes first and second sides 13a and 13b, respectively, spaced by outer periphery 15. In the depicted embodiment, plate 12 has a generally square configuration. However, plate 12 may have other configurations, for example, round, rectangular, triangular, or some other polygonal shape (not illustrated), without deviating from the scope of the present invention. Plate 12 further includes aperture 17 extending therethrough between the first and second sides 13a and 13b, respectively, and having a diameter of sufficient dimension to allow for outer surface 62 of cylindrical head 60 to pass therethrough, for reasons hereinafter described. Aperture 17 is defined by a generally circular sidewall 19 extending between first and second sides 13a and 13b, respectively, of plate 12.

Frame member 14 has a generally square configuration or cross-sectional profile shape and extends along a longitudinal axis. In alternate embodiments, the frame members 14 may have different cross-sectional profile shapes, for example, round, rectangular, triangular, or some other polygonal shape (not illustrated), depending on the desired end-use configuration. Frame member 14 has an outer surface that is defined by four faces 30a-30d. Each face 30a-30d is identical in structure and, as such, the description hereinafter of face 30a is understood to describe faces 30b-30d, as if fully described herein. As best seen in FIo FIG. 3, each face 30a of frame member 14 is generally flat and includes slot 32 therein that extends along the entire length thereof and that opens into a longitudinally extending cavity 33. Slot 32 and cavity 33 are substantially symmetrical, whereby description of structures at one side of the slot 32 and/or cavity 33 are equally applicable to the corresponding structures on the other side of the slot 32 and/or cavity 33, only being mirror images thereof.

Slot 32 is defined between first and second sidewalls 34 and 36, respectively, extending from face 30a at angles thereto. It is contemplated that the angles fall within the range of 1° and 89°, but is preferably between about 30° to about 80° and is most preferably about 70°. Correspondingly, in such a most preferred embodiment, each of the first and second sidewalls 34 and 36, respectively, defines an angle of about 20° with respect to an imaginary line that extends through the centerline of the slot 32, whereby the first and second sidewalls 34 and 36, respectively, define an angle of about 40° between each other. Slot 32 is further defined between first and second outer abutment walls 42 and 44, respectively, which diverge from corresponding terminal edges 34a and 36a, respectively, of first and second sidewalls 34 and 36, respectively. First outer abutment wall 42 angularly intersects first sidewall 34 to define an angle that is greater than 90° therebetween and second outer abutment wall 44 angularly intersects sidewall 36 to define an angle that is greater than 90° therebetween. Preferably, an angle defined between the first outer abutment wall 42 and the first sidewall 34 is between about 110° to about 160° and is most preferably about 1300.

From respective outermost portions, first and second inner abutment walls 46 and 48, respectively, define lines that extend angularly down and away from the face 30a, toward a middle portion of the cavity 33. Stated another way, from the inner lands 42a and 44a that connect the first and second outer abutment walls 42a and 44a, respectively, to corresponding first and second inner abutment walls 46 and 48, respectively, the first and second inner abutment walls 46 and 48, respectively, extend in opposing directions that diverge from each other and toward the face 30a. Inner land 42a defines a flat surface that defines an edge at the intersection of land 42a with corresponding outer and inner abutment walls 42 and 46, respectively. Similarly, inner land 44a defines a flat surface that defines an edge at the intersection of land 44a with corresponding outer and inner abutment walls 44 and 48, respectively. First and second outer abutment walls 42 and 44, respectively, are at steeper angles or relatively closer to orthogonal with respect to the face 30a than are first and second inner abutment walls 46 and 48, respectively, which are relatively closer to parallel with respect to the face 30a. First and second outer abutment walls 42 and 44, respectively, in one preferred embodiment, define angles of about 60° with respect to the face 30a, whereas first and second inner abutment walls 46 and 48 of this embodiment define angles of about 20° or 19° with respect to the face 30a. Concave terminal wall 50 extends between terminal edges 46a and 48a, respectively, of first and second inner abutment walls 46 and 48, respectively, and the cavity 33 is defined between the inner abutment walls 46, 48 and the concave terminal wall 50.

As heretofore described, it is intended for plate mount 10 to interconnect plate 12 to a frame member 14 of a frame assembly. As best seen in FIGS. 4-7, plate mount 10 includes a cylindrical head 60 defined by outer surface 62 having first and second opposite ends 64 and 66, respectively. Cylindrical head 60 has a diameter slightly less than the diameter of aperture 17 in plate 12 so as to allow cylindrical head 62 to pass therethrough. Flange 68 extends radially from outer surface 62 of cylindrical head at a location adjacent first end 64. Flange 68 includes lower surface 70 and chamfered upper surface 72 spaced from each other by outer peripheral edge 74. It is contemplated for outer peripheral edge 74 of flange 68 to define a circle having a diameter greater than the diameter of aperture 17 in plate 12 so as to prevent the entirety of cylindrical head 60 from passing therethrough. Mounting rail 76 extends outwardly from second end 66 in a longitudinal direction and along a central portion thereof. Mounting rail 76 has a perimeter shape that corresponds to the portion of slot 32 that is defined between the first and second slot sidewalls 34 and 36. As such, it can be appreciated that the shape of mounting rail 76 allows mounting rail 76 to nest into the slot 32, between the slot sidewalls 34 and 36, for reasons hereinafter described.

Bolt-receiving bore 80 that extends angularly, in a transverse direction, through cylindrical head 60 and through mounting rail 76. Bore 80 includes a first opening 80a communicating with first end 64 of cylindrical head 60 and a second end 80b communicating with lower surface 82 of mounting rail 76. Bore 80 defines a counter bore portion 84 adjacent first end 64 of cylindrical head 60 which is adapted for receiving bolt head 86 of bolt 88, FIGS. 1-3, as hereinafter described. It is preferred that bore 80 extends through plate mount 10 at an acute angle with respect to first end 64 of cylindrical head 60 in the range of and 89°, but preferably between about 30° and about 80°, and is most preferably about 70° but, regardless, is selected to align with a corresponding bore 120 of nut 90 which is described in greater detail below.

Referring back to FIGS. 1-3, in order to secure plate 12 to frame member 14 with plate mount 10, nut 90 is provided. Nut 90 is receivable within cavity 33 and is adapted for receiving terminal end 92 of bolt 88 extending through bore 80 in plate mount 10 so as to rigidly connect plate mount 12 to frame member 14. Nut 90 is sized to slide longitudinally through the cavity 33 and is intended to be captured within cavity 33 such that nut 90 does not rotate in unison with rotation of bolt 88. Nut 90 has a substantially planar upper wall 95 and a pair of outwardly tapering sidewalls 102 and 104 depending from opposite sides thereof. Tapering sidewalls 102 and 104 extend angularly from the upper wall 95 at angles that correspond to the angles of first and second outer abutment walls 42 and 44, respectively, between which the lower portion of the slot 32 is defined in frame member 14. A distance between the tapering sidewalls 102 and 104 is smaller than a distance between the first and second outer abutment walls 42 and 44, respectively, so that, during use, a clearance is defined between tapering sidewall 102 and first outer abutment wall 42 in a manner hereinafter described. A pair of shoulders 106 and 108 extend outwardly from lower portions of corresponding tapering sidewalls 102 and 104, respectively, and upwardly in a direction of the upper wall 95.

Shoulders 106 and 108 of nut 90 extend at corresponding angles that generally correspond to the angles defined between first and second inner abutment walls 46 and 48, respectively, and first and second outer abutments walls 42 and 44, respectively, of frame member 14. It is preferred that angles are obtuse angles, falling in the range of 91° and 179°, but preferably between about 95° and 105°, and is more preferably about 100°. Angles (not labeled) between shoulder 106 and the longitudinal axis of bore 120 through nut 90, and between shoulder 108 and the longitudinal axis of bore 120 are different. For example, the angle between shoulder 106 and the longitudinal axis of bore 120 is about 90°, and the angle between shoulder 108 and the longitudinal axis of bore 120 is about 55°. A lower curved wall 110 extends along an arcuate path between and connects outer ends of the shoulders 106 and 108. The profile shape and radius of curvature of the lower curved wall 110 of the nut 90 correspond to those characteristics of the concave terminal wall 50 that define the lower periphery of the cavity 33 of frame member 14.

Bore 120 extends orthogonally through nut 90 in a longitudinal direction of the nut 90 and angularly in a transverse direction of the nut 90. Bore 120 extends at the same angle as bore 80 through cylindrical head 60 of plate mount 10, namely, transversely at an acute angle. The acute angle of bore 120 falls in the range of 1 and 89°, but is preferably between about 30° and about 80°, and is most preferably about 65° with respect to the upper wall 95 of the nut 90. In this configuration, bore 120 has an upper opening that is substantially at a centerline of the nut 90 and a lower opening that is offset from the centerline of nut 90, being positioned below the outwardly tapered sidewall 102.

In order to interconnect plate 12 to frame member 14, plate mount 10, spacers 130a-130c, nut 90 and bolt 88 are used. Nut 90 is slid longitudinally into the cavity 33 of face 30a of frame member 14. Plate 12 is positioned on face 30a of frame member 14 such that aperture 17 is aligned with slot 32 therein and with bore 120 trough nut 90 received in cavity 33. At least one shim or spacer 130a-130c is positioned about outer surface 62 of cylindrical head 60 at a location between flange 68 and first side 13*a* of plate 12. It is intended for spacers 130*a*-130*c* to provide a gap 132 between second end 66 of cylindrical head 60 and 10*o* face 30*a* of frame member 14, for reasons hereinafter described. By way of example, three spacers 130*a*-130*c* are provided about outer surface 62 of cylindrical head 60, for reasons hereinafter described. However, other quantities of spacers are possible without deviating from the scope of the present invention. It can be appreciate that each spacer 130*a*-130*c* has an outer diameter greater than the diameter of aperture 17 in plate 12 and an inner diameter less than the diameter of flange 68. Thereafter, cylindrical head 60 is inserted through aperture 17 in plate 12 such that mounting rail 76 at second end 66 of cylindrical head 60 nests into slot 32 in face 30*a* of frame member 14 between slot sidewalls 34 and 36. Bolt 88 is inserted through bore 80 through cylindrical head 60 and is threaded into the threads of bore 120 through nut 90.

Still referring to FIG. 3, the tightening of bolt 88 into nut 90 provides multi-axial tightening plate mount 10 so as to clamp the stack of the cylindrical head 60, spacers 130*a*-130*c*, plate 12 and nut 90 together and transversely compresses plate 12 between face 30*a* and spacers 130*a*-130*c*. Tightening bolt 88 draws the nut 90 by advancing the nut 90 along the threads of bolt 88. This pulls nut 90 angularly up and across the cavity 33, toward the outer abutment wall 42 at the left-hand side, FIG. 3, of the slot 32. Shoulder 106 engages the inner abutment wall 46 of cavity 33 while the nut 90 is being drawn angularly up and across the cavity 33, which establishes a clearance between outer abutment wall 44 of frame member 14 and tapering sidewall 104. Such clearance provides enough space for nut 90 to pivot within the cavity 33. This is done by further tightening bolt 88 after shoulder 106 engages the inner abutment wall 46 so that further advancing nut 90 along bolt 88 pivots nut 90 about the inner land 42*a* between inner and outer abutment walls 46 and 42, respectively. Nut 90 then pivots about the inner land 42*a* until shoulder 108 engages the inner abutment wall 48 of cavity 33. When both shoulders 106 and 108 of the nut 90 engage corresponding first and second inner abutment walls 46 and 48, respectively, of frame member 14, further tightening of bolt 88 moves cylindrical head 60 closer to nut 90. This, in turn, urges first and second inner abutment walls 46 and 48, respectively, closer to each other, transversely compressing frame member 14 because of the wedging action between first and second inner abutment walls 46 and 48, respectively, and corresponding shoulders 106 and 108 such that first and second inner abutment walls 46 and 48, respectively, slide across shoulders 106 and 108, respectively, and toward tapering sidewalls 102 and 104 of the nut 90. In addition, as flange 68 is urged with cylindrical head 60 toward frame member 14, gap 132 between second side 66 of cylindrical head 60 and face 30*a* of frame member 14 allows for a clamping force to be exerted on plate 12 between spacer 130*c* and frame member 14 by flange 68 through spacers 130*a* and 130*b*. The clamping force is exerted on plate 12 prevents rotational movement of plate 12 relative to frame member 14 (and plate mount 10). Further, rotational movement of plate 12 will not cause corresponding rotational movement of cylindrical head 60 relative to frame member 14.

Various modes of carrying out the invention are contemplated as being within the scope of the following claims particularly pointing out and distinctly claiming the subject matter, which is regarded as the invention.

The invention claimed is:

1. A plate mount for mounting a plate having an inner face, an outer face and an aperture extending between the inner face and the outer face to a frame assembly including a frame member having an outer surface, defining a longitudinal axis, and having a slot that extends parallel to the longitudinal axis and a cavity that extends parallel to the longitudinal axis and connects to the slot, comprising:
    a nut receivable in the cavity;
    a generally cylindrical head extendable through the aperture in the plate and having an upper surface, a lower face, an outer peripheral surface, and an alignment structure receivable in the slot of the frame member, the cylindrical head including a bolt-receiving bore extending through the cylindrical head along a bore axis at acute angles to the upper face;
    a flange extending radially from the outer peripheral surface of the cylindrical head, the flange having a diameter;
    at least one spacer positionable about the outer peripheral surface of the cylindrical head at a location between the flange and the outer surface of the frame member, the at least one spacer having a diameter greater than a diameter of the aperture in the plate; and
    a bolt extends angularly through the slot and engages the nut received in the cavity so to interconnect the cylindrical head to the frame member and exert a clamping force on the plate between the at least one spacer and the frame member.

2. The plate mount of claim 1 wherein the frame member includes an outer abutment wall that defines at least a portion of a periphery of the slot, an inner abutment wall that is connected to the outer abutment wall and that defines at least a portion of a periphery of the cavity, and an edge defined at a location of connection between the outer and inner abutment walls, the edge defining a pivot point about which the nut can pivot when the nut engages the edge while moving angularly through the cavity and wherein the nut further includes a top wall and a shoulder that extend in a transverse direction away from the top wall, the shoulder engaging the inner abutment wall of the frame member.

3. The plate mount of claim 2 wherein the nut includes a sidewall that extends between the top wall and the shoulder.

4. The plate mount of claim 1 wherein the alignment structure includes first and second alignment walls intersecting the lower face of the cylindrical head.

5. The place mount of claim 4 wherein the first and second alignment walls diverge from each other as the first and second alignment walls extend away from the lower face of the cylindrical head.

6. The plate mount of claim 1 wherein the bolt-receiving bore includes an enlarged portion communicating with the upper surface of the cylindrical head and being adapted for receiving a head of the bolt therein.

7. The plate mount of claim 6 wherein the bolt-receiving bore includes a reduced diameter portion having a first end communicating with the enlarged portion of the bolt-receiving bore and a second end communicating with lower face of the cylindrical head, the reduced diameter portion of the bolt-receiving bore being adapted for receiving a shaft of the bolt therethrough.

8. A plate mount for mounting a plate to a frame assembly, comprising:
    a generally cylindrical head extendable through an aperture in the plate and having an upper surface, a lower face, an outer peripheral surface, and an alignment structure receivable in a slot of the frame member, the cylindrical head including a bolt-receiving bore extending through the cylindrical head along a bore axis at an acute angle to the upper face;

a flange extending radially extending from the outer peripheral surface of the cylindrical head, the flange having a diameter; and at least one spacer positionable about the outer peripheral surface of the cylindrical head at a location between the flange and the plate.

9. The plate mount of claim 8 wherein the alignment structure includes first and second alignment walls intersecting the lower face of the cylindrical head.

10. The place mount of claim 9 wherein the first and second alignment walls diverge from each other as the first and second alignment walls extend away from the lower face of the cylindrical head.

11. The plate mount of claim 8 wherein the bolt-receiving bore includes an enlarged portion communicating with the upper surface of the cylindrical head and being adapted for receiving a head of a bolt therein.

12. The plate mount of claim 11 wherein the bolt-receiving bore includes a reduced diameter portion having a first end communicating with the enlarged portion of the bolt-receiving bore and a second end communicating with lower face of the cylindrical head, the reduced diameter portion of the bolt-receiving bore being adapted for receiving a shaft of the bolt therethrough.

13. The plate mount of claim 8 further comprising a bolt and nut combination for interconnecting the plate mount to the frame assembly, the bolt extendable through the bolt-receiving bore and the nut receivable in a slot in the frame assembly.

14. A frame assembly, comprising:

a frame member having an outer surface, defining a longitudinal axis, and having a slot that extends parallel to the longitudinal axis and a cavity that extends parallel to the longitudinal axis and connects to the slot;

a plate having an inner face, an outer face and an aperture having a diameter and extending between the inner face and the outer face;

a nut receivable in the cavity;

a plate mount having:

a generally cylindrical head extendable through the aperture in the plate, the cylindrical hand including an upper surface, a lower face, an outer peripheral surface, an alignment structure receivable in the slot of the frame member, and a bolt-receiving bore extending between the upper surface and the lower face along a bore axis at acute angles to the upper face;

a flange extending radially form the outer peripheral surface of the cylindrical head, the flange having a diameter greater than the diameter of the aperture in the plate; and at least one spacer positionable about the outer peripheral surface of the cylindrical head at a location between the flange and the outer surface of the frame member, the at least one spacer having a diameter greater than the diameter of the aperture in the plate; and a bolt that extends angularly through the bolt-receiving bore and engages the nut received in the cavity so to interconnect the cylindrical head to the frame member and capture the plate between the at least one spacer and the frame member.

15. The plate mount of claim 14 wherein the alignment structure includes first and second alignment walls intersecting the lower face of the cylindrical head.

16. The place mount of claim 15 wherein the first and second alignment walls diverge from each other as the first and second alignment walls extend away from the lower face of the cylindrical head.

17. The plate mount of claim 14 wherein the bolt-receiving bore includes an enlarged portion communicating with the upper surface of the cylindrical head and being adapted for receiving a head of a bolt therein.

18. The plate mount of claim 17 wherein the bolt-receiving bore includes a reduced diameter portion having a first end communicating with the enlarged portion of the bolt-receiving bore and a second end communicating with lower face of the cylindrical head, the reduced diameter portion of the bolt-receiving bore being adapted for receiving a shalt of the bolt therethrough.

\* \* \* \* \*